United States Patent Office 3,250,589
Patented May 10, 1966

---

3,250,589
METHOD OF ACID LEACHING URANIUM ORES
Adolph E. Meyer, Wheat Ridge, Colo., assignor to Kerr-McGee Oil Industries, Inc., a corporation of Delaware
No Drawing. Filed Jan. 31, 1964, Ser. No. 341,770
19 Claims. (Cl. 23—14.5)

This invention relates to an improved method of acid leaching uranium ores. In one of its more specific variants, the invention relates to the acid leaching of uranium ores having a high alkaline earth metal carbonate content.

The percolation leaching of uranium ores with aqueous mineral acid has been studied by a number of investigators and the general principles to be followed are known. For example, heretofore classified uranium ores from which the slime fraction had been previously separated were percolation leached, or whole ore containing the slime fraction was agglomerated and then percolation leached. The agglomeration of crushed uranium ore having a low alkaline earth metal content with the mineral acid to be used in the subsequent mineral acid percolation leach has been effective in producing an agglomerated ore which may be used in preparing a leach bed that is substantially stable and resistant to plugging and thus practical circulation rates and satisfactory extraction of the uranium values may be achieved. However, in instances where the uranium ore also contains significant quantities of alkaline earth metal carbonate, the prior art agglomeration step fails to give satisfactory results due to excessive sliming and plugging of the leach bed and also the cost of chemicals is high. For example, when attempting to percolation leach uranium ores containing more than about 6% by weight alkaline earth metal carbonate, with or without a prior art agglomeration step, the resultant leach bed disturbance and freeing of slimes is so severe that the leach bed plugs and the flow of leaching solution is restricted to an impractical level. As a result, it has been necessary to resort to other more expensive or less efficient leaching processes when recovering uranium values from ores having a high alkaline earth metal carbonate content.

It has been discovered that uranium ores containing alkaline earth metal carbonate may be processed in accordance with the invention and readily percolation leached with aqueous mineral acid without plugging of the leach bed and with excellent recovery of the uranium values. It is possible for the first time to percolation leach uranium ore which contains more than 6% by weight alkaline earth metal carbonate in an economical, practical and efficient manner. It has been further discovered that it is possible to use much less mineral acid than was thought possible heretofore, regardless of the alkaline earth metal carbonate content of the uranium ore, thereby effecting substantial savings in the cost of chemicals.

It is an object of the present invention to provide a novel method of acid leaching uranium ores containing alkaline earth metal carbonate.

It is a further object to provide a novel method of acid leaching uranium ores containing more than 6% by weight alkaline earth metal carbonate.

It is still a further object to provide a novel method of agglomerating finely divided uranium ore having a high alkaline earth metal carbonate content and then percolation leaching the agglomerated ore whereby the uranium values may be recovered therefrom at high percolation rates.

Still other objects and advantages of the invention will be apparent to those skilled in the art upon reference to the following detailed description and the examples.

In accordance with one important variant of the invention, it has been discovered that uranium ores containing alkaline earth metal carbonates may be readily and easily percolation leached provided the finely divided ore is admixed with a water soluble alkali metal metasilicate, then agglomerated with mineral acid, and the agglomerated uranium ore percolation leached with aqueous mineral acid. Uranium ores containing, for example, 1–15% by weight of alkaline earth metal carbonate in the form of calcium carbonate, magesium carbonate, dolomite, and mixtures thereof, may be readily agglomerated and leached in accordance with the invention. In instances where the uranium ore contains not more than about 6% by weight of the alkaline earth metal carbonate, then the ore is agglomerated after treatment with the water soluble alkali metal metasilicate with about 75–100% of the amount of mineral acid theoretically required to react with the alkaline earth metal carbonate content to produce the alkaline earth metal mineral acid salt. However, in instances where more than 6% by weight of the alkaline earth metal carbonate is present, then less mineral acid should be used in agglomerating the ore. For example, when the uranium ore contains above 6% by weight of the alkaline earth metal carbonate, after treatment with sodium metasilicate the uranium ore is agglomerated with about 50–75% of that amount of mineral acid theoretically required to react with the alkaline earth metal carbonate content to produce the alkaline earth metal mineral acid salt. Thereafter the agglomerated uranium ore is leached with water or aqueous mineral acid to produce a leach liquor containing uranium values. Inasmuch as mineral acid is already present in the ore, when water is used initially as the leach solution obviously a dilute aqueous mineral acid is produced and is being used as a leach solution. However, it is usually preferred to use aqueous mineral acid initially as the leach solution so as to provide a desired terminal pH in the leach liquor.

Prior to agglomeration of the ore with the mineral acid, the water soluble alkali metal metasilicate is admixed with the finely divided ore in an amount of not less than about 0.1% by weight and preferably in an amount of 0.2–1% by weight. It is understood that larger amounts than 1% by weight may be used where it is not uneconomic. Regardless of the amount of alkali metal metasilicate which is used, for best results it should be thoroughly admixed with the finely divided uranium so as to be uniformly distributed therethrough prior to agglomeration. Water soluble sodium metasilicate is usually preferred over other alkali metal metasilicates.

If desired, on oxidizing agent for the uranium values may be added to the finely divided ore to be agglomerated. While any satisfactory oxidizing agent for the uranium values may be used, it is usually preferred to employ sodium chlorate in an amount of about 0.5–5 pounds per ton, and preferably in an amount of about 2 pounds per ton. The oxidizing agent may be added to the ground ore and thoroughly admixed therein at any suitable time prior to agglomeration.

It is also desirable in many instances to admix a surface active agent in the finely divided ore prior to agglomeration. The surface active agent may be any suitable wetting agent which aids in the wetting of the resultant agglomerated ore with the aqueous mineral acid leach solution, and may be a natural or synthetic substance. Examples of satisfactory wetting agents include synthetic materials sold under the trademark "Aerosol," which are said to be esters of a sulfonated dicarboxylic acid which resembles paraffin in appearance, of which Aerosol OT–75% gives especially good results.

At the time of agglomerating the finely divided uranium ore, it should have a moisture content of about 10-15% by weight for best results. If less than 10% by weight of moisture is present, in many instances the resultant agglomerates are not bound together sufficiently to result in optimum strength and hardness, and if more than 15% by weight of moisture is present, often the agglomerates are too soft and tend to deform in leach beds of substantial depth and thereby close off the pores and compact the leach bed. The particle size of the uranium ore should be such so as to allow it to be agglomerated readily and especially pelletized. Ore ground to pass a one-half inch screen, and preferably a one-quarter inch screen, gives very satisfactory results. Much finer ore such as −28 mesh may be employed if desired, as may ore having a larger particle size.

It is usually preferred that the agglomerated ore be retained in contact with the mineral acid with which it was agglomerated, i.e., cured for a substantial period of time before active leaching commences. For example, the agglomerated ore may be cured for at least two hours and preferably for at least four to eight hours prior to leaching. While there is no upper limit on the time that the agglomerated ore may be cured, usually about 24 hours is a practical upper limit for commercial practice. The curing step increases the strength of the agglomerates very markedly and allows them to be used in substantial bed depths, such as up to ten to twenty feet, without crushing or fining excessively. It also has the advantage of giving the mineral acid content of the agglomerates time to react with the alkaline earth metal carbonate content and release carbon dioxide which otherwise would normally tend to cause leach bed disturbance, fines and slime release during the leaching step.

The cured agglomerated ore preferably is soaked in an aqueous medium for at least two hours and for best results at least four to eight hours prior to active leaching. In the soaking step, the cured agglomerates may be merely contacted with aqueous mineral acid to thereby allow the uranium values to be solubilized to some extent or converted to a more soluble form. Also, the agglomerates are penetrated and wetted throughout by the aqueous mineral acid and this aids in shortening the period normally required for an effective leach cycle.

The agglomerated ore may be formed into a leach bed of desired depth and thereafter percolation leached over the period of time necessary to effect solubilization of the uranium values. This will vary somewhat depending upon the nature of the specific uranium ore employed, and whether or not a soak period precedes the percolation leach. However, usually the percolation leach is finished within 24 hours and often within four to eight or ten to twelve hours. In instances where a surface active agent was admixed with the finely divided ore to be agglomerated, then often the leach cycle may be shortened substantially as the uranium values seem to be solubilized more rapidly and effectively. The percolation leach may be carried out in accordance with general prior art practice in a leach column, vat, tank or the like. If desired, the leach liquor may be recycled to a single vat, or a series of vats may be used and the leach liquor passed in series through agglomerated uranium ore of increasing richness in uranium values to thereby assure that a higher concentration of uranium is obtained in the leach liquor.

The resultant leach liquor containing dissolved uranium values may be processed in accordance with prior art practice to obtain a uranium-containing product of commerce. For example, the leach liquor may be solvent extracted with an organic solvent extractant for the uranium values, the loaded solvent extractant stripped with a stripping solution, and the uranium values precipitated from the stripping solution with sodium hydroxide. It is also possible to chemically precipitate the uranium values from the leach liquor after purification in accordance with prior art practice.

Ore agglomerated in accordance with the present invention may be percolation leached at high flow rates with excellent uranium recovery and without the leach bed becoming unstable or plugging. However, it is important that the correct amount of mineral acid be employed in agglomerating the ore as otherwise satisfactory results are not obtained. The process described herein is especially useful for percolation leaching uranium ores containing 6-15% by weight of alkaline earth metal carbonates. In instances where the alkaline earth metal carbonate content is about 6% by weight or less, then the ore may be treated with a relatively small amount of sodium metasilicate such as 5 pounds per short ton and the treated ore may be agglomerated with 75-100% of the amount of mineral acid theoretically required to convert the carbonate to the mineral acid salt. Where the ore contains above 6% by weight alkaline earth metal carbonate, then for best results it should be treated with greater amounts of sodium metasilicate such as 10-20 pounds per short ton; however, the amount of mineral acid used in the acid agglomeration step must be less, such as about 50-75% of that theoretically required to convert the carbonate to the mineral acid salt. Preferably, about 50% of the theoretical amount of acid is used when the alkaline earth metal carbonate content of the ore approaches 15% by weight, and for best results at levels above about 10-12% by weight. In instances where the alkaline earth metal carbonate content approaches 6% by weight, then preferably more mineral acid is used such as 75% of the theoretical amount. Following the acid agglomeration step, and curing and/or soaking, if performed, the agglomerated ore may be percolation leached with water containing additional mineral acid, if necessary, to produce a final effluent from the leach bed having a pH value of about 1-1.5.

The specific mineral acid to be used will depend somewhat upon the type of uranium ore being leached. In instances where uranium values are recovered from a high lime uranium ore, then it is preferred that the mineral acid be sulfuric acid. However, other mineral acids such as hydrochloric acid may be used and may be preferred under specialized conditions.

The foregoing detailed description and the following specific examples are for purposes of illustration only and are not intended as being limiting to the spirit or scope of the appended claims.

*Example I*

A Shirley Basin uranium ore containing about 10% lime (alkaline earth metal carbonate) is crushed to pass a one-quarter inch screen and then admixed with about 10 pounds per short ton of sodium metasilicate and 2 pounds per short ton of sodium chlorate. The moisture content of the ore is determined and adjusted to provide 10% by weight of moisture. The resultant mixture is intimately admixed in a mixer-muller, and then 100 pounds of concentrated sulfuric acid per short ton of ore is added thereto. After intimately admixing the sulfuric acid and the treated ore in a mixer-muller, it is pelletized in a drum-type pelletizing machine to produce +28 mesh pellets strong enough to withstand a 10-12 foot drop when charging into an empty leach tank. The hardness and overall strength of the pellets is further improved by curing in the leach tank for approximately 16 hours at a temperature of 90-100° C. It is not necessary to heat the pellets during the curing period as the heat released upon reaction of the sulfuric acid with the ore is sufficient to provide this temperature range.

The cured pellets are loaded into the leach tank to a depth of approximately 10 feet and soaked in dilute aqueous sulfuric acid for 24 hours. Thereafter, the cured pellets are percolation leached for a period of 24 hours with aqueous sulfuric acid containing sufficient sulfuric acid to provide a terminal pH of 1.0. Upon analysis, approximately 98-99% of the uranium content of the ore is recovered in the leach liquor which may be processed following conventional procedures for recovery of the uranium values. During the percolation leaching of the ore, no problems are encountered due to sliming, fining of the ore or plugging of the leach bed and an extremely rapid, efficient, percolation leach at high flow rates result.

*Example II*

The general procedure of Example I for pelletizing the ore and curing the pellets is repeated with the exception of adding 0.2 pound of Aerosol OT–75% (a synthetic surface active agent) to each short ton of the finely divided ore prior to sulfuric acid addition and pelletizing. Samples of cured pellets obtained as in Example I, and samples of cured pellets obtained by this example are loaded to the same depth in identical columns and aqueous sulfuric acid of the same concentration was poured into the tops of the columns and allowed to percolate downward through the ore beds. The times required for wetting the two columns of ore are recorded. 53 minutes are required to wet the bed of pelletized ore from Example I when contacted with aqueous sulfuric acid leach solution, as determined by the actual elapsed time between starting the wash at the top of the column until the first solution emerged from the bottom of the column, as compared with only 7 minutes for the pelletized ore of this example when the Aerosol OT–75% was present. Thus, addition of a small amount of surface active agent to the ore to be pelletized has a very marked effect upon the wetting of the cured pelletized ore.

*Example III*

The general procedure of Example I is followed with the exception of employing in the pelletizing step 100% of the amount of sulfuric acid theoretically required to react with the alkaline earth metal carbonate content of the ore, rather than approximately one-half as in Example I. When the pelletized ore of this example is leached, the resulting slimes plug the leach bed, thereby markedly reducing the flow rate and interfering with the percolation leach process. Thus, the additional sulfuric acid during the pelletizing step results in an adverse effect on the subsequent percolation leach.

*Example IV*

The general procedure of Example I is followed with the exception of employing in the pelletizing step 75% of the theoretical quantity of sulfuric acid required to react with the alkaline earth metal carbonate content of the ore, rather than 100% as in Example III. A satisfactory percolation leach results; however, the uranium recovery is not improved and thus less acid normally should be employed as there is a saving in chemicals.

*Example V*

The procedure of Example I is followed in a series of runs with the exception of varying the moisture content of the ore to be pelletized. In instances where there is less than about 10% by weight moisture, then the resultant pellets are not sufficiently strong to prevent their fracturing into fragments which tend to pack and plug the leach bed during the subsequent leaching step. Also, when more than about 15% by weight moisture is present, the pellets are too soft and may not be loaded to a substantial depth without packing and tending to plug the leach bed. Thus, a moisture content in the ore to be pelletized between about 10 and 15% by weight is preferred for best results.

What is claimed is:

1. A method of acid leaching uranium ore comprising admixing water-soluble alkali metal metasilicate with uranium ore containing alkaline earth metal carbonate selected from the group consisting of calcium carbonate, magnesium carbonate, dolomite and mixtures thereof,
and thereafter leaching the uranium ore with aqueous mineral acid to produce a leach liquor containing uranium values.

2. The method of claim 1 wherein the mineral acid is sulfuric acid.

3. The method of claim 1 wherein the uranium ore contains not more than 6 percent by weight of alkaline earth metal carbonate.

4. The method of claim 1 wherein the alkali metal metasilicate is sodium metasilicate.

5. The method of claim 1 wherein the mineral acid is sulfuric acid and the alkali metal metasilicate is sodium metasilicate.

6. The method of claim 1 wherein the mineral acid is sulfuric acid, the alkali metal metasilicate is sodium metasilicate and the uranium ore contains not more than about 6 percent by weight of alkaline earth metal carbonate.

7. The method of acid leaching uranium ore comprising
admixing about 0.2–1 percent by weight of water-soluble alkali metal metasilicate with finely divided uranium ore containing alkaline earth metal carbonate selected from the group consisting of calcium carbonate, magnesium carbonate, dolomite and mixtures thereof,
agglomerating the uranium ore with mineral acid,
and thereafter leaching the agglomerated uranium ore with aqueous mineral acid to produce a leach liquor containing uranium values.

8. The method of claim 7 wherein the mineral acid is sulfuric acid.

9. The method of claim 7 wherein the uranium ore contains not more than 6 percent by weight of alkaline earth metal carbonate.

10. The method of claim 7 wherein the alkali metal metasilicate is sodium metasilicate.

11. The method of claim 7 wherein the mineral acid is sulfuric acid and the alkali metal metasilicate is sodium metasilicate.

12. The method of claim 7 wherein the mineral acid is sulfuric acid, the alkali metal metasilicate is sodium metasilicate and the uranium ore contains not more than about 6 percent by weight of alkaline earth metal carbonate.

13. A method of acid leaching uranium ore comprising
admixing about 0.2–1 percent by weight of water-soluble alkali metal metasilicate with finely divided uranium ore containing about 1–15% of alkaline earth metal carbonate selected from the group consisting of calcium carbonate, magnesium carbonate, dolomite and mixtures thereof,
agglomerating the uranium ore with mineral acid, the uranium ore being agglomerated with about 75–100% of the amount of mineral acid theoretically required to react with the alkaline earth metal carbonate content to produce the alkaline earth metal mineral acid salt when the uranium ore contains not more than 6 percent of the alkaline earth metal carbonate, the uranium ore being agglomerated with about 50–75% of the amount of mineral acid theoretically required to react with the alkaline earth metal carbonate content to produce the alkaline earth metal mineral acid salt when the uranium ore contains above 6 perecent of the alkaline earth metal carbonate,
and thereafter leaching the agglomerated uranium ore with aqueous mineral acid to produce a leach liquor containing uranium values.

14. The method of claim 13 wherein the mineral acid is sulfuric acid.

15. The method of claim 13 wherein the alkali metal metasilicate is sodium metasilicate.

16. The method of claim 13 wherein the mineral acid is sulfuric acid and the alkali metal metasilicate is sodium metasilicate.

17. The method of claim 13 wherein the finely divided uranium ore to be agglomerated has a particle size of less than one-half inch, a moisture content of about 10–15% by weight, and contains admixed therein an oxidizing agent for the uranium values and a wetting agent for increasing the rate at which the aqueous mineral acid wets the agglomerated uranium ore.

18. The method of claim 17 wherein prior to leaching the agglomerated uranium ore is cured for at least two hours and then soaked in aqueous mineral acid for at least two hours.

19. A method of acid leaching uranium ore comprising
  admixing in finely divided uranium ore about 0.2–1% by weight of sodium metasilicate, about 0.5–5 pounds per short ton of sodium chlorate as an oxidizing agent for the uranium values, and about 0.01–1 pound per short ton of a synthetic surface active agent for increasing the rate at which the aqueous sulfuric acid wets the uranium ore,
  the uranium ore having a particle size of less than one-half inch and containing about 1–15% by weight of alkaline earth metal carbonate selected from the group consisting of calcium carbonate, magnesium carbonate, dolomite, and mixtures thereof,
  admixing sulfuric acid in the uranium ore and pelletizing the uranium ore with the sulfuric acid, the uranium ore when pelletized having a moisture content of about 10–15% by weight,
  the uranium ore being pelletized with about 75–100% of the amount of sulfuric acid theoretically required to react with the alkaline earth metal carbonate content to produce the alkaline earth metal sulfate when the uranium ore contains not more than 6% by weight of the alkaline earth metal carbonate, the uranium ore being agglomerated with about 50–75% of the amount of sulfuric acid theoretically required to react with the alkaline earth metal carbonate content to produce the alkaline earth metal sulfate when the uranium ore contains above 6% by weight of the alkaline metal carbonate,
  curing the pelletized uranium ore for about 4–24 hours to thereby harden the pellets and render them more resistant to crushing,
  soaking the cured pelletized uranium ore in aqueous mineral acid for about 4–24 hours,
  and thereafter percolation leaching a bed of the cured pelletized uranium ore with aqueous sulfuric acid to produce a leach liquor containing dissolved uranium values.

References Cited by the Examiner

UNITED STATES PATENTS 2,890,933  6/1959  Michal et al. _____ 23—14.5

LEON D. ROSDOL, *Primary Examiner.*

CARL D. QUARFORTH, *Examiner.*

M. J. SCOLNICK, *Assistant Examiner.*